(12) United States Patent
Partin et al.

(10) Patent No.: US 8,138,726 B2
(45) Date of Patent: Mar. 20, 2012

(54) ELECTRONICS WITH MULTIPLE CHARGE RATE

(75) Inventors: Phillip E. Partin, Grafton, MA (US); Christina M. Lampe-Onnerud, Framingham, MA (US)

(73) Assignee: Boston-Power, Inc., Westborough, MA (US)

( * ) Notice: Subject to any disclaimer, the term of this patent is extended or adjusted under 35 U.S.C. 154(b) by 0 days.

(21) Appl. No.: 12/906,676

(22) Filed: Oct. 18, 2010

(65) Prior Publication Data
US 2011/0115434 A1    May 19, 2011

Related U.S. Application Data

(63) Continuation of application No. 11/823,479, filed on Jun. 27, 2007, now Pat. No. 7,825,636.

(60) Provisional application No. 60/816,977, filed on Jun. 28, 2006.

(51) Int. Cl.
*H02J 7/00* (2006.01)

(52) U.S. Cl. .................. 320/160; 320/116; 320/137

(58) Field of Classification Search .............. 320/160, 320/116, 137
See application file for complete search history.

(56) References Cited

U.S. PATENT DOCUMENTS

| | | |
|---|---|---|
| 3,665,285 A | 5/1972 | Mullersman et al. |
| 4,280,578 A | 7/1981 | Perkins |
| 4,553,081 A | 11/1985 | Koenck |
| 4,670,703 A * | 6/1987 | Williams ................ 320/125 |
| 5,254,931 A | 10/1993 | Martensson |
| 5,325,040 A | 6/1994 | Bogut et al. |
| 5,471,128 A | 11/1995 | Patino et al. |
| 5,493,199 A | 2/1996 | Koenck et al. |
| 5,504,415 A | 4/1996 | Podrazhansky et al. |
| 5,506,490 A | 4/1996 | DeMuro |
| 5,510,693 A * | 4/1996 | Theobald ................ 320/151 |
| 5,565,756 A | 10/1996 | Urbish et al. |
| 5,567,539 A | 10/1996 | Takahashi et al. |
| 5,608,305 A | 3/1997 | Kokuga |
| 5,617,010 A | 4/1997 | Higashijima et al. |
| 5,677,083 A | 10/1997 | Tomiyama |
| 5,677,944 A | 10/1997 | Yamamoto et al. |
| 5,683,634 A | 11/1997 | Fujii et al. |
| 5,694,021 A | 12/1997 | Morioka et al. |
| 5,714,866 A | 2/1998 | S et al. |
| 5,773,962 A | 6/1998 | Nor |
| 5,789,902 A | 8/1998 | Abe et al. |

(Continued)

FOREIGN PATENT DOCUMENTS

CN          1700498          11/2005

(Continued)

OTHER PUBLICATIONS

*Unpublished U.S. Appl. No. 12/872,651, filed Aug. 31, 2010 to Onnerud et al.

(Continued)

*Primary Examiner* — M'Baye Diao
(74) *Attorney, Agent, or Firm* — Hamilton, Brook, Smith & Reynolds, P.C.

(57) ABSTRACT

One or more buttons, located either on a battery pack or on an electronic device powered by the battery pack, that allow the user to charge the battery of a portable device faster than normal. Electronic circuitry is provided for activating the charge mode choices.

32 Claims, 5 Drawing Sheets

U.S. PATENT DOCUMENTS

| | | |
|---|---|---|
| 5,879,834 A | 3/1999 | Mao |
| 5,883,498 A | 3/1999 | Van Beek et al. |
| 5,920,180 A | 7/1999 | Kim |
| 5,939,864 A | 8/1999 | Lenhart et al. |
| 5,955,797 A * | 9/1999 | Kim ............................. 307/150 |
| 5,986,433 A | 11/1999 | Peele et al. |
| 5,993,998 A | 11/1999 | Yasuda |
| 6,008,627 A | 12/1999 | Narita |
| 6,033,797 A | 3/2000 | Mao et al. |
| 6,074,523 A | 6/2000 | Mizobuchi et al. |
| 6,114,835 A | 9/2000 | Price |
| 6,114,836 A | 9/2000 | Hagiwara et al. |
| 6,133,709 A | 10/2000 | Puchianu |
| 6,159,636 A | 12/2000 | Wang et al. |
| 6,166,522 A | 12/2000 | Patino et al. |
| 6,184,656 B1 | 2/2001 | Karunasiri et al. |
| 6,218,806 B1 | 4/2001 | Brotto et al. |
| 6,239,579 B1 | 5/2001 | Dunn et al. |
| 6,265,107 B1 | 7/2001 | Shimizu et al. |
| 6,267,943 B1 | 7/2001 | Manev et al. |
| 6,275,497 B1 | 8/2001 | Varma et al. |
| 6,291,973 B1 | 9/2001 | Lee |
| 6,333,128 B1 | 12/2001 | Sunagawa et al. |
| 6,342,774 B1 | 1/2002 | Kreisinger et al. |
| 6,395,426 B1 | 5/2002 | Imachi et al. |
| 6,462,513 B1 | 10/2002 | Bradus et al. |
| 6,482,550 B1 | 11/2002 | Imachi et al. |
| 6,521,379 B2 | 2/2003 | Nishida et al. |
| 6,534,216 B1 | 3/2003 | Narukawa et al. |
| 6,551,744 B1 | 4/2003 | Ohzuku et al. |
| 6,582,854 B1 | 6/2003 | Qi et al. |
| 6,653,021 B2 | 11/2003 | Kweon et al. |
| 6,677,080 B2 | 1/2004 | Tanizaki et al. |
| 6,677,082 B2 | 1/2004 | Thackeray et al. |
| 6,682,850 B1 | 1/2004 | Numata et al. |
| 6,700,350 B2 | 3/2004 | Formenti et al. |
| 6,746,800 B1 | 6/2004 | Sunagawa et al. |
| 6,808,848 B2 | 10/2004 | Nakanishi et al. |
| 6,818,351 B2 | 11/2004 | Sunagawa et al. |
| 7,014,954 B2 | 3/2006 | Yamaguchi et al. |
| 7,034,506 B2 | 4/2006 | Chen et al. |
| 7,138,207 B2 | 11/2006 | Yamaguchi et al. |
| 7,198,871 B2 | 4/2007 | Kitao et al. |
| 7,258,948 B2 | 8/2007 | Miyamoto et al. |
| 7,309,546 B2 | 12/2007 | Kweon et al. |
| 7,338,734 B2 | 3/2008 | Chiang et al. |
| 7,402,360 B2 | 7/2008 | Imachi et al. |
| 7,656,125 B2 | 2/2010 | Lampe-Onnerud et al. |
| 7,692,407 B2 | 4/2010 | Nozawa |
| 7,825,636 B2 | 11/2010 | Partin et al. |
| 2001/0020927 A1 | 9/2001 | Ikawa et al. |
| 2001/0026147 A1 | 10/2001 | Nakashimo |
| 2002/0001745 A1 | 1/2002 | Gartstein et al. |
| 2002/0004169 A1 | 1/2002 | Yamada et al. |
| 2002/0012841 A1 | 1/2002 | Kurose et al. |
| 2002/0061443 A1 | 5/2002 | Nakanishi et al. |
| 2002/0089308 A1 | 7/2002 | Sakurai |
| 2002/0090546 A1 | 7/2002 | Mu-Tsai et al. |
| 2002/0189431 A1 | 12/2002 | Carrier |
| 2003/0054251 A1 | 3/2003 | Ohzuku et al. |
| 2003/0073002 A1 | 4/2003 | Imachi et al. |
| 2003/0087154 A1 | 5/2003 | Ohzuku et al. |
| 2003/0138699 A1 | 7/2003 | Kweon et al. |
| 2003/0148183 A1 | 8/2003 | Yamasaki |
| 2003/0170540 A1 | 9/2003 | Ohzuku et al. |
| 2003/0180615 A1 | 9/2003 | Johnson et al. |
| 2003/0180616 A1 | 9/2003 | Johnson et al. |
| 2004/0058243 A1 | 3/2004 | Ohzuku et al. |
| 2004/0081888 A1 | 4/2004 | Thakeray et al. |
| 2004/0096743 A1 | 5/2004 | Okae et al. |
| 2004/0126660 A1 | 7/2004 | Ohzuku et al. |
| 2004/0197650 A1 | 10/2004 | Kubota et al. |
| 2004/0197654 A1 | 10/2004 | Barker et al. |
| 2004/0202933 A1 | 10/2004 | Yamaki et al. |
| 2005/0026040 A1 | 2/2005 | Thackeray et al. |
| 2005/0079416 A1 | 4/2005 | Ohzuku et al. |
| 2005/0142442 A1 | 6/2005 | Yuasa et al. |
| 2005/0147889 A1 | 7/2005 | Ohzuku et al. |
| 2005/0170250 A1 | 8/2005 | Ohzuku et al. |
| 2005/0186474 A1 | 8/2005 | Jiang et al. |
| 2006/0035151 A1 | 2/2006 | Kumeuchi et al. |
| 2006/0063073 A1 | 3/2006 | Kawashima et al. |
| 2006/0222936 A1 | 10/2006 | Yamaguchi et al. |
| 2007/0013347 A1 | 1/2007 | Kamohara |
| 2007/0026315 A1 | 2/2007 | Lampe-Onnerud et al. |
| 2007/0082265 A1 | 4/2007 | Itou et al. |
| 2007/0111098 A1 | 5/2007 | Yang Kook et al. |
| 2007/0298314 A1 | 12/2007 | Partin et al. |
| 2008/0008933 A1 | 1/2008 | Lampe-Onnerud |
| 2008/0048614 A1 | 2/2008 | Partin et al. |
| 2009/0009176 A1 | 1/2009 | Nakao |
| 2009/0029193 A1 | 1/2009 | Onnerud et al. |
| 2010/0108291 A1 | 5/2010 | Onnerud et al. |
| 2010/0121511 A1 | 5/2010 | Onnerud et al. |
| 2010/0164436 A1 | 7/2010 | Lampe-Onnerud et al. |
| 2010/0289457 A1 | 11/2010 | Onnerud et al. |
| 2011/0049977 A1 | 3/2011 | Onnerud et al. |
| 2011/0115434 A1 | 5/2011 | Partin et al. |

FOREIGN PATENT DOCUMENTS

| | | |
|---|---|---|
| EP | 0 450 783 A2 | 10/1991 |
| EP | 0 450 783 A3 | 10/1991 |
| EP | 0 762 521 A2 | 3/1997 |
| EP | 0 762 521 A3 | 5/1997 |
| EP | 0 932 240 A2 | 7/1999 |
| EP | 0 932 240 A3 | 7/1999 |
| EP | 0 949 702 A1 | 10/1999 |
| EP | 0 973 217 A2 | 1/2000 |
| EP | 0 997 957 A1 | 5/2000 |
| EP | 0 999 604 A1 | 5/2000 |
| EP | 1 022 792 A1 | 7/2000 |
| EP | 1 100 133 A2 | 5/2001 |
| EP | 0 997 957 B1 | 8/2001 |
| EP | 1 237 213 A2 | 9/2002 |
| EP | 1 296 391 A1 | 3/2003 |
| EP | 1 309 022 A2 | 5/2003 |
| EP | 1 309 022 A3 | 5/2003 |
| EP | 0 949 702 B1 | 8/2003 |
| EP | 1 383 183 A1 | 1/2004 |
| EP | 1 487 039 A1 | 12/2004 |
| EP | 1 538 686 A1 | 6/2005 |
| EP | 1 237 213 A3 | 11/2005 |
| JP | 5082131 | 4/1993 |
| JP | 08-221157 A | 8/1996 |
| JP | 2000-012030 | 1/2000 |
| JP | 2000-323186 | 11/2000 |
| JP | 2001-128389 A | 5/2001 |
| JP | 2001-195353 A | 7/2001 |
| JP | 2001-243943 A | 9/2001 |
| JP | 2001-319647 | 11/2001 |
| JP | 2001328818 | 11/2001 |
| JP | 2002-042815 | 2/2002 |
| JP | 2002-075369 A | 3/2002 |
| JP | 2002216745 | 8/2002 |
| JP | 2002251996 | 9/2002 |
| JP | 2003-197180 | 7/2003 |
| JP | 2004-006094 A | 1/2004 |
| JP | 2005 073434 A | 3/2005 |
| JP | 2007-118680 | 5/2007 |
| JP | 2007-149561 | 6/2007 |
| JP | 2007-157631 | 6/2007 |
| JP | 2007-318855 A | 12/2007 |
| KR | 10-20080081446 A | 9/2008 |
| KR | 10-2008-0091392 | 10/2008 |
| KR | 10-2009-0052897 | 5/2009 |
| WO | WO 93/19508 A1 | 9/1993 |
| WO | WO 98/24131 A | 6/1998 |
| WO | WO 99/53556 | 10/1999 |
| WO | WO 02/078105 A1 | 10/2002 |
| WO | WO 03/026047 A1 | 3/2003 |
| WO | WO 03/075376 A1 | 9/2003 |
| WO | WO 03/092099 A1 | 11/2003 |
| WO | WO 2004/019433 A1 | 3/2004 |
| WO | WO 2004/097964 A2 | 11/2004 |
| WO | WO 2004/097964 A3 | 11/2004 |
| WO | WO 2004/105162 A1 | 12/2004 |
| WO | WO 2005/031892 A2 | 4/2005 |

| | | | |
|---|---|---|---|
| WO | WO 2006/071972 A2 | 7/2006 |
| WO | WO 2006/071972 A3 | 7/2006 |
| WO | WO 2007/011661 A1 | 1/2007 |
| WO | WO 2007/149102 A1 | 12/2007 |
| WO | WO 2008/002486 A2 | 1/2008 |
| WO | WO 2008/002487 A2 | 1/2008 |
| WO | WO 2008/002607 A2 | 1/2008 |
| WO | WO 2009/002438 A1 | 12/2008 |
| WO | WO 2010/030875 A1 | 3/2010 |
| WO | WO 2010/042517 A1 | 4/2010 |
| WO | WO 2010/135260 A2 | 11/2010 |

OTHER PUBLICATIONS

*Unpublished U.S. Appl. No. 12/872,494, filed Aug. 31, 2010 to Onnerud et al.
*Final Office Action for U.S. Appl. No. 12/651,024; Date Mailed: Nov. 24, 2010.
*Non-Final Office Action for U.S. Appl. No. 11/823,479; Date Mailed: Jan. 6, 2010.
*Amendment in Response to Jan. 6, 2010 Office Action for U.S. Appl. No. 11/823,479, filed Jun. 4, 2010.
*Notice of Allowance and Fee(s) Due for U.S. Appl. No. 11/823,479; Date Mailed: Jul. 16, 2010.
Notification of Transmittal of the International Search Report and the Written Opinion of the International Searching Authority for Int'l Application No. PCT/US2006/027245; Date Mailed: Oct. 25, 2006.
Amendment Under Article 34 and Reply to Written Opinion for Int'l Application No. PCT/US2006/027245; Date Filed: May 10, 2007.
Notification of Transmittal of the International Preliminary Report on Patentability for Int'l Application No. PCT/US2006/027245; Date Mailed: Nov. 16, 2007.
Notification of Transmittal of the International Search Report and the Written Opinion of the International Searching Authority for Int'l Application No. PCT/US2007/014905; Date Mailed: Dec. 27, 2007.
Notification Concerning Transmittal of International Preliminary Report on Patentability for Int'l Application No. PCT/US2007/014905; Date Mailed: Jan. 15, 2009.
Notification of Transmittal of the International Search Report and Written Opinion of the International Searching Authority for Int'l Application No. PCT/US2009/059696, Date Mailed: Feb. 4, 2010.
Amendment Under Article 34 and Reply to Written Opinion for Int'l Application No. PCT/US2009/059696; Date Filed: Aug. 6, 2010.
Notification of Transmittal of the International Preliminary Report on Patentability for Int'l Application No. PCT/US2009/059696; Date Mailed: Sep. 6, 2010.
Notification of Transmittal of the International Search Report and the Written Opinion of the International Searching Authority for Int'l Application No. PCT/US2009/056656, Date Mailed: Dec. 18, 2009.
Amendment Under Article 34 and Reply to Written Opinion for Int'l Application No. PCT/US2009/056656; Date Filed: Jul. 9, 2010.
Notification of Transmittal of the International Preliminary Report on Patentability for Int'l Application No. PCT/US2009/056656, Date Mailed: Dec. 17, 2010.

Notification of Transmittal of the International Search Report and the Written Opinion of the International Searching Authority for Int'l Application No. PCT/US2010/035154; Date Mailed: Dec. 27, 2010.
Deng, B. et al., "Greatly improved elevated-temperature cycling behavior of Li1+xMgyMn2-x-yO4+δ spinels with controlled oxygen stiochiometry," Electrochimica Acta (49)11:1823-1830 (2004).
Ohzuku, T. et al., "Electrochemistry of Manganese Dioxide in Lithium Nonaqueous Cell," J. Electrochemical Society, (137)3:769-775 (Mar. 1, 1990).
Cho, J. et al., "Zero-Strain Intercalation Cathode for Rechargeable Li-Ion Cell," Angew.Chem. Int. Ed. (40)18:3367-3369 (2001) (Month not available).
Biancomano, V., EEProductCenter Gas Gauge Chipset Advances Li-ion Battery Protection [online] Dec. 2006 [retrieved on Jan. 17, 2007]. Retrieved form the internet <URL: http://www.eeproductcenter.com/showArticle.jhtml?articleID=196700961>.
Sony BP-GL95 Rechargeable Lithium-ion Battery Pack [online]. [retrieved on Jan. 17, 2007]. Retrieved from the internet: <URL: http://www.expandore.com/product/sony/Proav/model/accessories/BPGL95.htm>.
Aspen Nexus 50, 14.4 Volt, 50 WH Lithium Ion Battery W/4 Level Led Status Display [online]. [retrieved on Jan. 17, 2007]. Retrieved from the internet: <URL: http://www.tristatecamera.com/lookat.php?sku=ASPNEXUS50&cs=find.php&action=search &target=products&keywords=Nexus%2050&search_method=all>.
NP-QM91D InfoLithium M Series Rechargeable Battery Back NP-QM91D [online]. Sony Corporation [retrieved on Jan. 17, 2007]. Retrieved from the internet: <URL: http://www.sonystyle.com/webapp/wcs/stores/servlet/ProductDisplay?catalogId=10551 &storeId=10151&langId=-1&productId=11040750>.
Texas Instruments "bq20z8OEVM-001 SBS 1.1 Impedance Track Technology Enabled Battery Management Solution Evaluation Module". Oct. 2004—Revised May 2005.
Texas Instruments "SBS 1.1 Compliant Gas Gauge Enabled with Impedance Track Technology for use with bq29330". Dec. 2005—Revised Jun. 2006.
Texas Instruments "SBS v1.1 Compliant Gas Gauge for use with bq29312". Jul. 2005—Revised Aug. 2006.
Notification of Transmittal of the International Search Report and The Written Opinion of the International Searching Authority, or The Declaration from PCT/US2010/047315, date of mailing May 13, 2011.
Notification of Transmittal of the International Search Report and The Written Opinion of the International Searching Authority, or The Declaration from PCT/US2010/047285, date of mailing Apr. 14, 2011.
SBS 1.1—Compliant Gas Gauge and Protection Enabled With Impedance TrackTexas Instruments; Production Data Dated: Dec. 2009, Texas Instruments, 20 pages.

* cited by examiner

ELECTRONICS WITH MULTIPLE CHARGE RATE

RELATED APPLICATION(S)

This application is a continuation of U.S. application Ser. No. 11/823,479, filed Jun. 27, 2007, now issued U.S. Pat. No. 7,825,636, which claims the benefit of U.S. Provisional Application No. 60/816,977, filed on Jun. 28, 2006. The entire teachings of the above applications are incorporated herein by reference.

BACKGROUND OF THE INVENTION

The portable power industry has traditionally been using charge rates between 0.7C and 1C ("constant current" charge rates) when charging electronic devices, which is the rate used for laptop computers. This current allows the notebook computer's battery pack to be charged at constant currents that are 70% to 100% of the value of rated capacity of the cells. For example, in a battery pack containing 18650 cells, rated at 2.2Ah, in a 2p3s configuration (two cells in parallel, three cells in series), a charging current of 1C would be equivalent to a constant charging current of 4.4 A for the pack. This charging current is allowed until a maximum voltage ($V_{max}$) is reached, which is typically set at about 4.2V. Once $V_{max}$ has been reached, the current is lowered by control circuitry to disallow, in this example, any of the three blocks of two parallel cells to reach voltage levels higher than 4.2V. In addition to the current being limited, the charging rate is even slower once $V_{max}$ has been reached. Electronic circuits managing this type of functionality are known in the art and have been implemented in battery packs for notebook computers. For a notebook computer, typical charging times are of several hours to reach a fully charged battery.

Safety and battery life are the main problems with providing faster charging. Practically, for lithium ion (Li-ion) batteries during fast charging, batteries may locally display overcharging, which may deposit lithium onto the carbon anode. This lithium deposit lowers safety of the battery, which may more easily go into thermal runaway, increase its internal gas pressure, and eventually explode. Another problem with fast charging is the rapid change of electrode dimensions, such as thickness variation. Mechanical degradation of the electrode structure is faster during this relatively fast charge than what would be the case for slower charging. These limiting features concern all Li-ion batteries, more or less, depending on battery design. Batteries may be designed to take charge faster by limiting impact of detrimental aspects, such as safety and battery life.

However, for batteries having multiple cells in parallel, a particular concern arises when trying to quickly charge battery packs. This concern has to do with the imbalance of cells in parallel. Impedance and capacity degradation is different between cells due to differences between cells during manufacturing and environmental exposure after manufacturing (i.e., temperature, vibration, mechanical shock, etc.). This means that two cells, having initially similar conditions in terms of (i.e., capacity and impedance), will display different performance after a few months of use. Each block of parallel cells will be limited by the weakest cell, having lowest capacitance and/or highest impedance, as this is the cell that will reach $V_{max}$ earlier than the cell having better characteristics. As cycling progresses, the weakest cell will degrade even quicker, as it will always be the cell that experiences the most extreme conditions. Safety is also a concern as performance is decreased. The cell having the lowest performance will normally be the cell having the highest chance of being overcharged, thereby being a safety concern.

SUMMARY OF THE INVENTION

The summary that follows details some of the embodiments included in this disclosure. The information is proffered to provide a fundamental level of comprehension of aspects of the present invention. The details are general in nature and are not proposed to offer paramount aspects of the embodiment. The only intention of the information detailed below is to give simplified examples of the disclosure and to introduce the more detailed description. One skilled in the art would understand that there are other embodiments, modifications, variations, and the like included within the scope of the claims and description.

An embodiment of the disclosure includes an apparatus for and a corresponding method of charging a charge storage power supply in an electronic device. In one embodiment, an electronic device with multiple charge rates comprises the following: a device housing, a charge storage power supply, electronics in the device housing, a charging circuit, and a manually actuated mode switch. The aforementioned charge storage power supply may be coupled to the device housing. Additionally, the apparatus and method may allow the electronics in the device housing to be powered by said charge storage power supply. The previously mentioned charging circuit may have plural modes of operation to charge the charge storage power supply from an external power source at different charging rates, for example, fast or slow mode charging. The apparatus and method may also allow the manually actuated mode switch to change the charging rate of the charging circuit.

The apparatus for and method of charging a charge storage power supply in an electronic device may also include a single storage cell that serves as the charge storage power supply. The charge storage supply may be comprised of multiple cells, preferably in series with no cells in parallel. The mode switch may be located on the battery pack housing of the charge storage power supply. The mode switch may also be implemented in software. The charging circuit may be located in a battery pack housing, which houses the charge storage power supply.

Another embodiment of the disclosure may include an apparatus for a battery pack with multiple charge rates comprising the following: a battery pack housing; a charge storage power supply within the battery pack housing; a charging circuit within the battery pack housing having plural modes of operation to charge the charge storage power supply from an external power source at different charging rates; and a manually actuated mode switch to change charging rate of the charging circuit. The charge storage power supply may include a single storage cell or multiple cells in series with no cells in parallel.

The apparatus for a battery pack with multiple charge rates may also include normal charge rate and plural fast charge rates. The mode switch may be on the battery pack housing. The battery pack may be coupled to an electronic device, which may be a notebook computer. The mode switch of battery pack coupled to an electronic device may be implemented in software on the electronic device.

Unlike battery chargers used in connection with commercial devices, such as power tools, embodiments of the present invention allow for fast charging of a charge storage power supply that may be coupled to the housing of an electronic device or within the battery pack housing. Additionally, in accordance with the disclosure, an electronic device may be used to more effectively implement a fast charge mode in existing chipsets.

BRIEF DESCRIPTION OF THE DRAWINGS

The foregoing and other objects, features and advantages of the disclosure will be apparent from the following more particular description of preferred embodiments of the disclosure, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of example embodiments of the invention follows.

Figure 1:
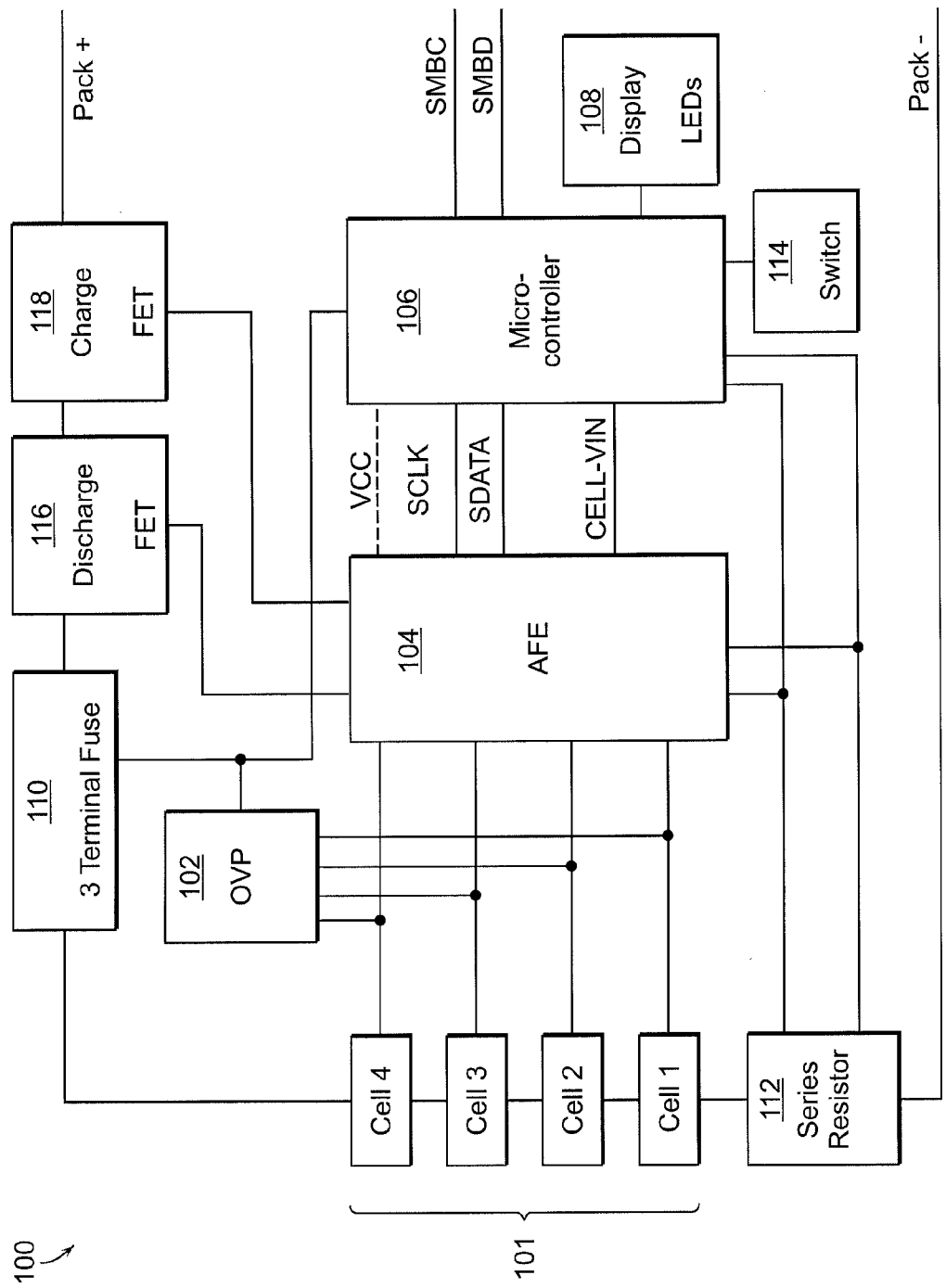
FIG. 1 shows a functional block diagram of the electronic circuitry upon which the present embodiment may be implemented.

FIG. 1 illustrates a functional block diagram of the electronic circuitry 100 in a battery pack as used in current practice upon which the present embodiment may be implemented. In FIG. 1, a multiple cell battery 101 may be connected to an independent overvoltage protection integrated circuit (OVP) 102, an Analog Front End protection integrated circuit (AFE) 104, and a battery monitor integrated circuit microcontroller (microcontroller) 106. One with skill in the art will understand that the present invention is not limited to the aforementioned electronic circuitry of the schematic illustrated in FIG. 1.

The OVP 102 may allow for monitoring of each cell of the battery pack by comparing each value to an internal reference voltage. By doing so, the OVP 102 may be able to initiate a protection mechanism if cell voltages perform in an undesired manner, e.g., voltages exceeding optimal levels. The OVP 102 is designed to trigger the non-resetting fuse 110 if the preset overvoltage value (i.e., 4.35V, 4.40V, 4.45V, and 4.65V) is exceeded for a preset period of time and provides a third level of safety protection.

The OVP 102 may monitor each individual cell of the multiple cell battery 101 across the Cell 4, Cell 3, Cell 2, and Cell 1 terminals (which are ordered from the most positive cell to most negative cell, respectively). The OVP 102 is powered by multiple cell battery 101 and may be configured to permit cell control for any individual cell of the multiple cell battery 101.

The AFE 104 may be used by the system host controller to monitor battery pack conditions, provide charge and discharge control via charge FET 118 and discharge FET 116 respectively, and to provide updates of the battery status to the system. The AFE 104 communicates with the microcontroller 106 to enhance efficiency and safeness. The AFE 104 may provide power via the VCC connection to the microcontroller 106 using input from a power source (e.g., the multiple cell battery 101), which would eliminate the need for peripheral regulation circuitry. Both the AFE 104 and the microcontroller 106 may have terminals, which may be connected to a series resistor 112 that may allow for monitoring of battery charge and discharge. Using the CELL terminal, the AFE 104 may output a voltage value for an individual cell of the multiple cell battery 101 to the VIN terminal of the battery monitor integrated circuit microcontroller 106. The microcontroller 106 communicates with the AFE 104 via the SCLK (clock) and SDATA (data) terminals.

The microcontroller 106 may be used to monitor the charge and discharge for the multiple cell battery 101. The microcontroller 106 may monitor the charge and discharge activity using the series resistor 112 placed between the negative cell of the multiple cell battery 101 and the negative terminal of the battery pack. The analog-to-digital converter (ADC) of the microcontroller 106 may be used to measure the charge and discharge flow by monitoring the series resistor 112 terminals. The ADC of the microcontroller 106 may be used to produce control signals to initiate optimal or appropriate safety precautions for the multiple cell battery 101. If the microcontroller 106 detects abnormal or unsafe conditions it will disable the battery pack by triggering the non-resetting fuse 110.

While the ADC of the microcontroller 106 is monitoring the voltage across the series resistor 112 terminals, the microcontroller 106 (via its VIN terminal) may be able to monitor each cell of the multiple cell battery 101 using the CELL terminal of the AFE 104. The ADC may use a counter to permit the integration of signals received over time. The integrating converter may allow for continuous sampling to measure and monitor the battery charge and discharge current by comparing each cell of the multiple cell battery 101 to an internal reference voltage. The display terminal of the microcontroller 106 may be used to run the LED display 108 of the multiple cell battery 101. The display may be initiated by closing a switch 114.

The microcontroller 106 may be used to monitor the multiple cell battery 101 conditions and to report such information to the host system controller across a serial communication bus (SMBus). The SMBus communication terminals (SMBC and SMBD) may allow a system host controller, SMBus compatible device, or similar device (hereinafter called "processor") to communicate with the microcontroller 106. A processor may be used to initiate communication with the microcontroller 106 using the SMBC and SMBD pins, which may allow the system to efficiently monitor and manage the multiple cell battery 101. The processor may be the microcontroller 106 itself and may contain internal data flash memory, which can be programmed to include information, such as capacity, internal reference voltage, or other similar programmable information.

The AFE 104 and microcontroller 106 provide the primary and secondary means of safety protection in addition to charge and discharge control. Examples of current practice primary safety measures include battery cell and pack voltage protection, charge and discharge overcurrent protection, short circuit protection, and temperature protection. Examples of currently used secondary safety measures include monitoring voltage, battery cell(s), current, and temperature.

The continuous sampling of the multiple cell battery 101 may allow the electronic circuitry to monitor or calculate characteristics of a multiple cell battery 101, such as state-of-charge, temperature, charge, or the like. One of the parameters that is controlled by the electronic circuitry 100 is the allowed charging current (ACC). An aspect of the disclosed embodiments is to allow the user of a portable device to have the option to control this parameter by selecting a fast or slow charging mode. When selecting the mode of charging, the ACC parameter changes in addition to other parameters necessary to control the charging of the battery within safe limits. This allows a battery to be optionally charged faster than what would have been traditionally available. The user of the portable device may also control the charge mode by allowing the user to adjust the fast charge mode in steps (e.g., normal, fast, super fast, ultra fast, etc.) or on a continuous scale (e.g., 1×, 2×, 3×, 4×, etc.). A user may prefer to have more control over the fast charge mode parameter because such allows the user to balance performance (i.e., battery cycle life) against charge tradeoffs.

The program stored for the battery monitor integrated circuit microcontroller 106 may be modified to implement the fast charge indications described herein. The electronic circuit in FIG. 1 could be programmed with parameters suitable for the respective battery used in the battery 101. Each battery manufacturer has unique chemistry and interpretation of how the battery may be used in best mode to provide long cycle life, high capacity, and high safety. One with skill in the art will understand that a microcontroller used in accordance with the present invention is not limited to the design of FIG. 1.

It is preferred, though not required, that the cells in a multiple cell battery 101 be in series due to different impedances of the cells. Impedance imbalance may result from temperature gradients within the pack and manufacturing variability from cell to cell. Two cells having different impedances may have approximately the same capacity when charged slowly. It may be seen that the cell having the higher impedance reaches its upper voltage limit ($V_{max}$) in a measurement set (e.g., 4.2V) earlier than the other cell. If these two cells were in parallel in a battery pack, the charging current would therefore be limited to one cell's performance, which prematurely interrupts the charging for the other cell in parallel. This degrades both pack capacity as well as pack charging rate. In order to avoid these detrimental effects, it is therefore preferred for the current embodiments to utilize battery packs having only one cell or all cells in series having a fast charge option. Such preferred configurations are described in PCT/US2005/047383, and U.S. Provisional Application Nos. 60/639,275; 60/680,271; and 60/699,285; which are hereby incorporated by reference in their entireties. A preferred battery is disclosed in a U.S. Application for Lithium Battery With External Positive Thermal Coefficient Layer, filed Jun. 23, 2006, by Phillip Partin and Yanning Song, incorporated by reference in its entirety.

Figure 2:
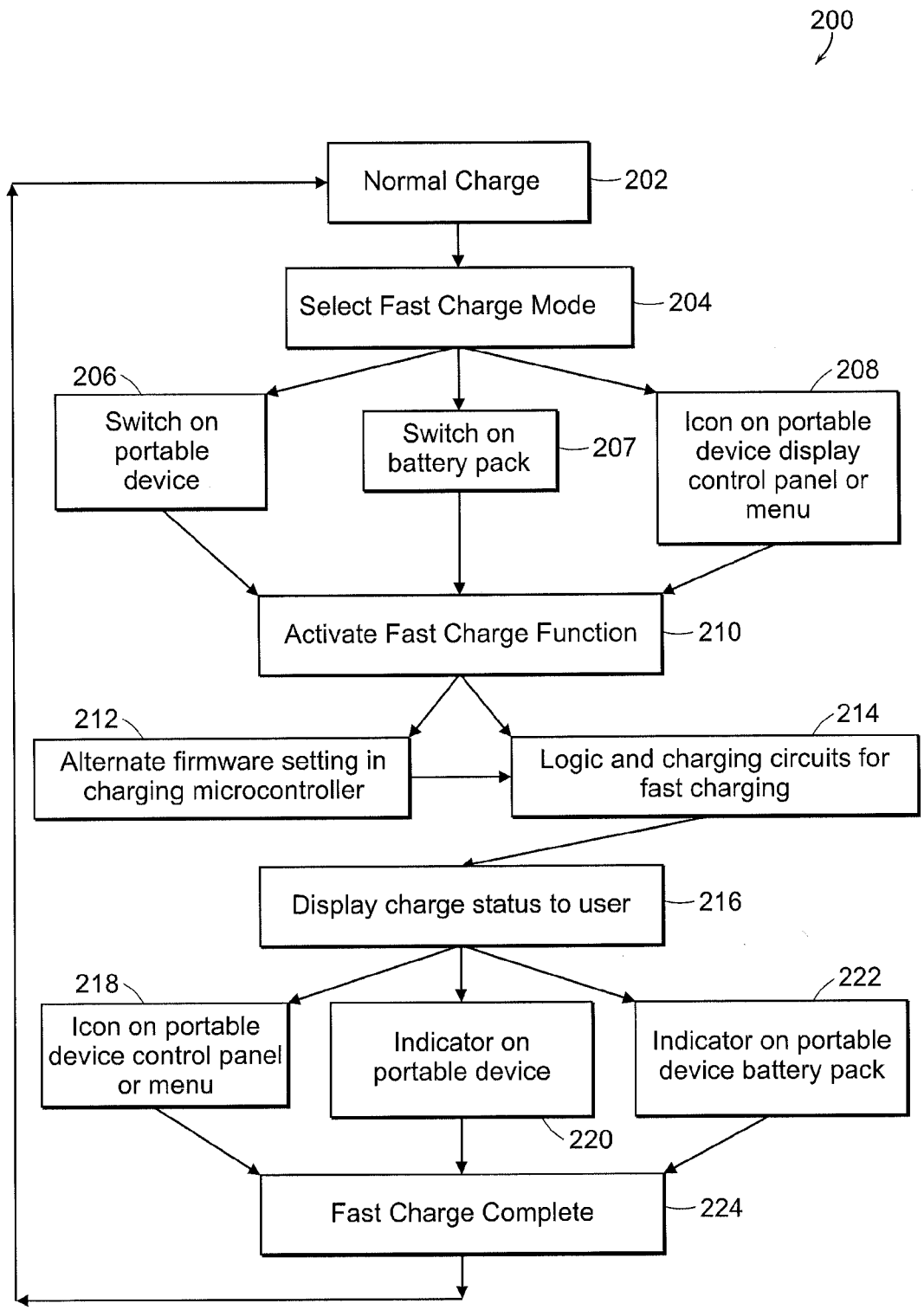
FIG. 2 illustrates a process flow diagram of an exemplary fast charge process.

FIG. 2 illustrates a process flow diagram of an exemplary fast charge process 200 where a user is presented with the option of choosing the normal charge mode (Step 202) of the portable device battery pack. If the user opts to use the fast charge mode (Step 204), the user can do so via one of three mediums: a switch on the portable device (Step 206), a switch on the battery pack (Step 207), or an icon on the portable device display control panel or menu (Step 208), any one or more of which may be available. From either of the three mediums, the user can initiate the fast charge function (Step 210). The initiation of the fast charge function (Step 210) can be done either by an alternate firmware setting in the charging battery monitor integrated circuit microcontroller 106 (Step 212) or the logic and charging circuits for fast charging (Step 214). The alternate firmware setting in charging the battery monitor integrated circuit microcontroller 106 (Step 212) then uses the logic and charging circuits for fast charging (Step 214). After using the logic and charging circuits for fast charging (Step 214), the process will display the charge status to the user (Step 216), which can occur in one of the following mediums: an icon on the portable device control panel or menu (Step 218), an indicator on the portable device (i.e., LED display 108) (Step 220), or an indicator on the portable device battery pack (Step 222). After using either of the three mediums to display the charge status to the user (Step 216), the fast charge process 200 is complete (Step 224). After the fast charge process 200 is completed (Step 224), the portable device battery pack may return to normal charge mode (Step 202).

Figure 3A:
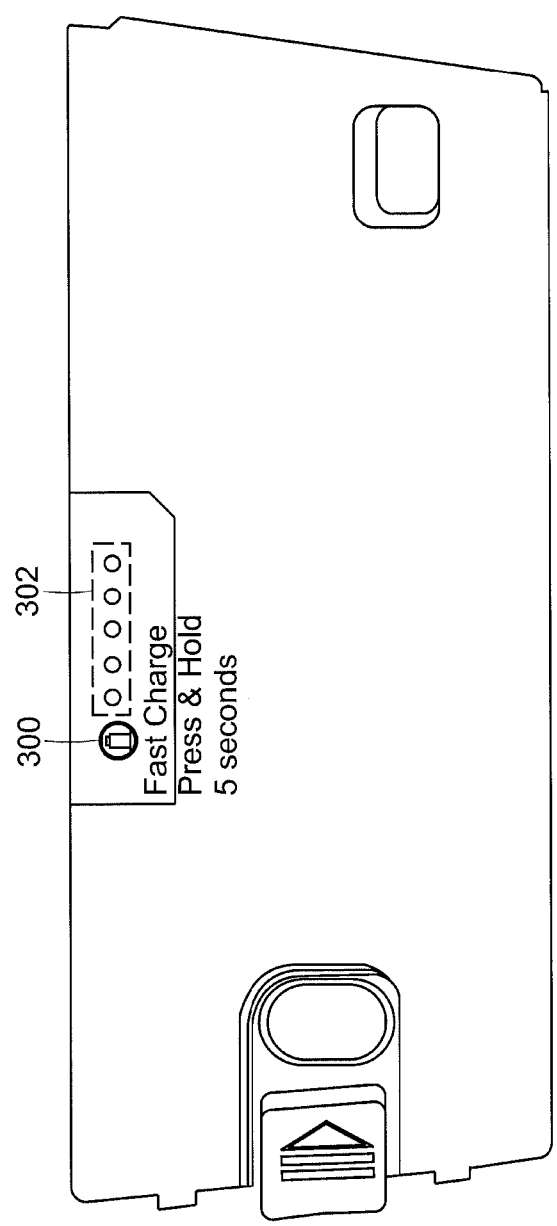
FIG. 3A illustrates a fast charge button and display on a battery pack upon which the state-of-charge of a battery pack may also be shown.
Figure 3B:
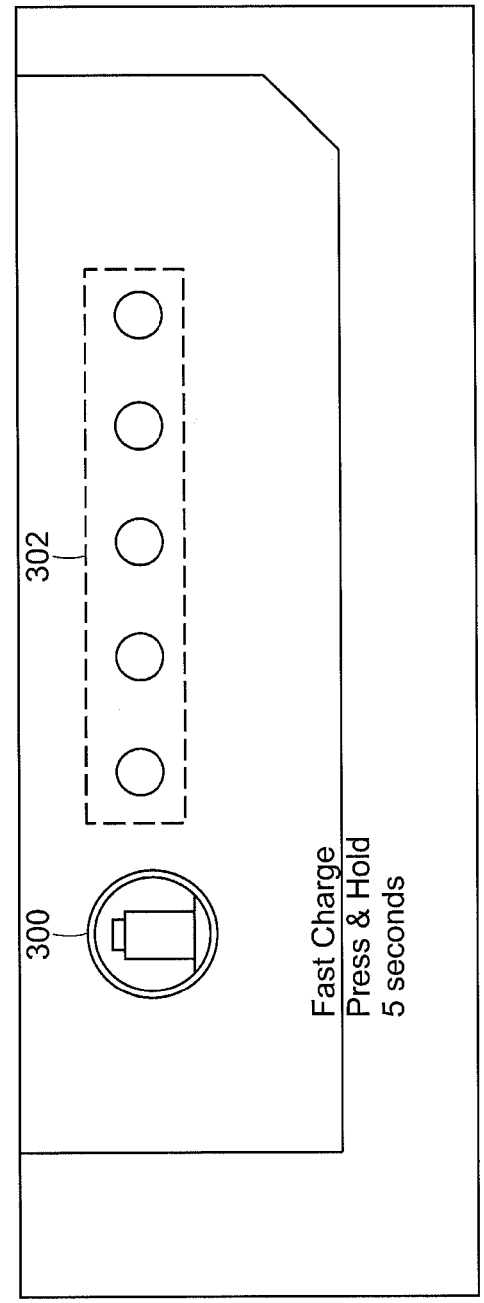
FIG. 3B provides a close-up view of the aforementioned fast charge button and display on the battery pack of a portable device.

FIG. 3A illustrates a fast charge button 300 on a battery pack upon which the fast charge status of a battery pack may also be displayed. This button 300, when pushed, closes switch 114 (see FIG. 1) and triggers the activation of fast charging, which allows the battery to be charged quicker than would normally be allowed. Select numbers of presses of the button may distinguish different functions controlled through switch 114. The fast charge button 300 could also be implemented through software allowing, for example, the use of a mouse click (see FIG. 4C). The fast charge status of the portable device battery pack may be displayed using a display of light-emitting diodes (LEDs) 202. FIG. 3B provides a close-up view of the aforementioned fast charge button 300 and LED display 302 on a portable device battery pack in accordance with the disclosure.

Figure 4A:
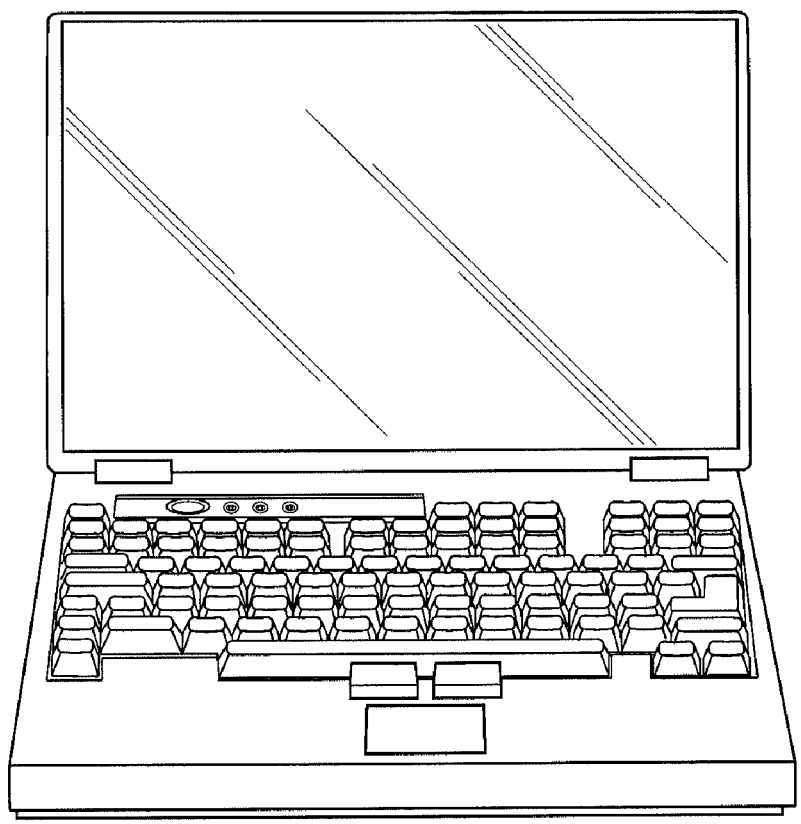
FIG. 4A illustrates a notebook computer with a "FAST CHARGE" button located on the keyboard.
Figure 4B:
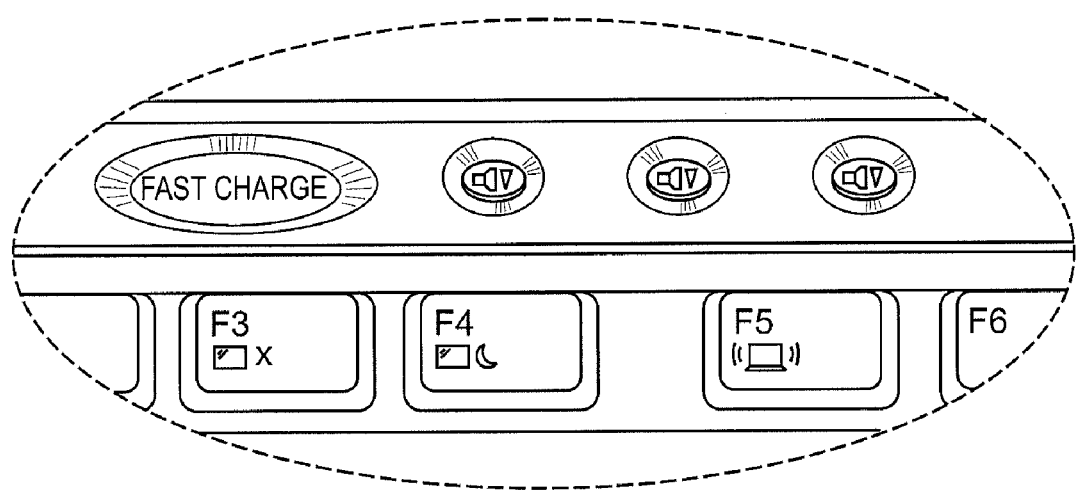
FIG. 4B shows a close-up view of the "FAST CHARGE" button located on a notebook computer keyboard.
Figure 4C:
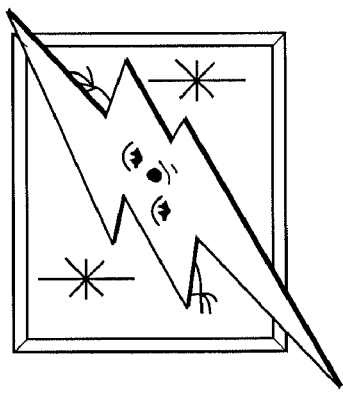
FIG. 4C shows an exemplary user interface display window that may appear to present a user with the option to initiate software that will perform the "fast charge" option of the portable device battery pack.
Figure 4C:
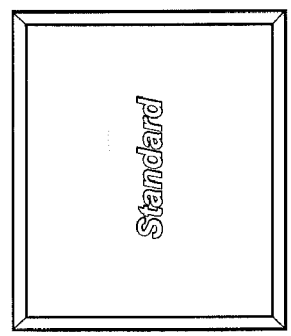

FIG. 4A illustrates a model laptop have a "FAST CHARGE" button located on the keyboard. FIG. 4B shows a close-up view of the "FAST CHARGE" button located on the model laptop keyboard. FIG. 4C shows an exemplary pop-up window that may appear to present a user with the option of initiating software that will perform the "fast charge" option of the battery. Upon pressing the "FAST CHARGE" button located on the laptop keyboard or through a menu operation of the laptop, the user may be presented with the option of charging the portable device battery pack via standard mode or the fast charge mode. The display could show the approximate times either mode may take. One with skill in the art will understand that the aforementioned statements are only meant to be exemplary in nature and not to limit the scope of the present invention.

The function button brings awareness to electronic device users of the availability of the option of fast charge—compared to the regular charge cycle offered. This button may sit on the face, side or bottom of the laptop device to allow the user to select fast charge. The first step in the process of using the function button is to select the fast charge protocol for a battery pack. Next, the user should select an "activation mode" of circuitry that activates parameters in the electronic circuit having settings suitable for fast charging. The function button may be positioned directly on said battery pack, on the device, in the software, or any combination thereof.

The function button may be implemented with multiple portable power type devices, such as laptop computer, cell phone, DVD player, or camcorder. The purpose of the function button is to allow the user to "fast charge" to a charge that is less than 100% in reduced time. The function button may also be connected to a display that displays parametric values, such as percentage (%) of State of Charge (SOC), time to 100% SOC, estimated charge to partial % SOC, and other parameters related to the user's ability to judge when it is appropriate to prematurely (meaning before 100% SOC) interrupt charging sequence.

The term "switch" includes buttons, physical and display based switches, and can be in the form of knobs, toggles, and the like.

While this disclosure has been particularly shown and described with references to preferred embodiments thereof, it will be understood by those skilled in the art that various changes in form and details may be made therein without departing from the scope of the embodiment encompassed by the appended claims.

What is claimed is:

1. An electronic device comprising:
   a device housing;
   a lithium ion charge storage power supply coupled to the device housing;
   electronics in the device housing powered by the charge storage power supply; and
   a charging circuit having plural modes of operation to charge the charge storage power supply from an external power source at least three different charging rates.

2. The electronic device as claimed in claim 1, wherein the charge storage power supply is a single storage cell.

3. The electronic device as claimed in claim 1, wherein the charge storage power supply comprises multiple cells in series with no cells in parallel.

4. The electronic device as claimed in claim 1, wherein the modes of operation to charge the storage power supply includes a normal charge rate and at least one fast charge rate.

5. The electronic device as claimed in claim 4, wherein the charging circuit transitions to the normal charge rate upon completing the at least one fast charge rate.

6. The electronic device as claimed in claim 1, wherein electronics of the electronic device form a computer.

7. A method of charging a lithium ion charge storage power supply in an electronic device, the method comprising:
   powering electronics in the electronic device by the lithium ion charge storage power supply;
   changing a charging rate of a charging circuit among at least three different charging rates; and
   charging the charge storage power supply coupled to the electronic device from an external power source at the charging rate.

8. The method as claimed in claim 7, wherein charging the charge storage supply includes charging a single storage cell.

9. The method as claimed in claim 7, wherein charging the charge storage supply includes charging multiple cells in series with no cells in parallel.

10. The method as claimed in claim 7, wherein changing a rate of charging a charging circuit having plural modes of operation includes changing between a constant current normal charge rate and at least one constant current fast charge rate.

11. The method as claimed in claim 10, further comprising transitioning to the normal charge rate upon completing the at least one fast charge rate.

12. The method as claimed in claim 7, further including housing the charging circuit in a battery pack that houses the charge storage power supply.

13. The method as claimed in claim 7, wherein the electronic device includes electronics forming a computer.

14. The method as claimed in claim 7, wherein the charging circuit includes a constant current normal charge mode and at least one constant current fast charge mode.

15. The method as claimed in claim 14, wherein the at least one fast charge mode has a charge rate substantially greater than a charge rate of the normal charge mode.

16. The method as claimed in claim 14, wherein the normal mode has a constant current charge rate equal to or less than 1C and the at least one fast charge mode has a constant current charge rate greater than 1C.

17. The method as claimed in claim 14, wherein the at least one fast charge mode enables a charge time less than half of a charge time enabled by the normal mode.

18. The electronic device as claimed in claim 1, wherein the plural modes of operation include a constant current normal mode and at least one constant current fast charge mode.

19. The electronic device as claimed in claim 18, wherein the at least one fast charge mode has a charge rate substantially greater than a charge rate of the normal mode.

20. The electronic device as claimed in claim 18, wherein the normal mode has a charge rate equal to or less than 1C and the at least one fast charge mode has a charge rate greater than 1C.

21. The electronic device as claimed in claim 18, wherein the at least one fast charge mode enables a charge time less than half of a charge time enabled by the normal mode.

22. The electronic device as claimed in claim 1, wherein the microcontroller monitors the charging rate of the battery pack.

23. The electronic device as claimed in claim 22, further comprising a host controller in communication with the microcontroller, and wherein the microcontroller communicates to the host controller the monitored charge rate of the battery pack.

24. The electronic device as claimed in claim 22, wherein the host controller monitors and manages the charge rate of the battery pack.

25. A portable computer comprising:
   a computer device housing;
   a lithium ion battery pack coupled to the device housing;
   electronics in the device housing powered by the battery pack; and
   a microcontroller that changes the charging rate of the battery pack among at least three different charging rates.

26. The portable computer as claimed in claim 25, wherein the at least three different charge rates include a normal mode having a constant current charge rate equal to or less than 1C and at least one fast charge mode having a constant current charge rate substantially greater than 1C.

27. The portable computer as claimed in claim 26, wherein the at least three different charge rates include at least two fast charge modes.

28. The portable computer as claimed in claim 26, wherein the at least three different charge rates include a slow charging mode.

29. The electronic device as claimed in claim 1, wherein the modes of operation to charge the storage power supply include at least two fast charge modes.

30. The electronic device as claimed in claim 1, wherein the modes of operation to charge the storage power supply include a slow charge mode.

31. The method as claim in claim 7, wherein changing a rate of charging a charging circuit having plural modes of operation includes changing between a constant current normal charge rate and at least two constant current fast charge rates.

32. The method as claimed in claim 7, wherein changing a rate of charging a charging circuit having plural modes of operation includes changing between a constant current normal charge rate, a constant current fast charge rate, and a constant current slow charge rate.

* * * * *